United States Patent
Mehta et al.

(10) Patent No.: US 9,831,533 B2
(45) Date of Patent: Nov. 28, 2017

(54) ENERGY STORAGE STRUCTURES AND FABRICATION METHODS THEREOF

(71) Applicant: The Paper Battery Co., Troy, NY (US)

(72) Inventors: Shreefal Sudhir Mehta, Loudonville, NY (US); Anthony Sudano, Laval (CA); Renato Friello, Schenectady, NY (US); Sudhir Rajaram Kulkarni, Rensselaer, NY (US); Dave Rich, Middleburgh Heights, OH (US)

(73) Assignee: The Paper Battery Co., Troy, NY (US)

( * ) Notice: Subject to any disclaimer, the term of this patent is extended or adjusted under 35 U.S.C. 154(b) by 400 days.

(21) Appl. No.: 14/215,571

(22) Filed: Mar. 17, 2014

(65) Prior Publication Data

US 2014/0287277 A1    Sep. 25, 2014

Related U.S. Application Data

(60) Provisional application No. 61/801,206, filed on Mar. 15, 2013, provisional application No. 61/884,324, filed on Sep. 30, 2013.

(51) Int. Cl.
*H01M 10/04* (2006.01)
*H01G 9/15* (2006.01)
(Continued)

(52) U.S. Cl.
CPC ........ *H01M 10/4264* (2013.01); *H01G 9/155* (2013.01); *H01G 11/08* (2013.01);
(Continued)

(58) Field of Classification Search
CPC ..... H01M 10/045; H01G 9/155; H01G 11/84; H01G 11/80; H01G 11/78
See application file for complete search history.

(56) References Cited

U.S. PATENT DOCUMENTS

| | | |
|---|---|---|
| 3,907,599 A | 9/1975 | Fanciullo et al. |
| 5,587,250 A | 12/1996 | Thomas et al. |

(Continued)

FOREIGN PATENT DOCUMENTS

| | | |
|---|---|---|
| CN | 101814773 A | 8/2010 |
| CN | 102044905 A | 5/2011 |

(Continued)

OTHER PUBLICATIONS

International Search Report for International Application No. PCT/US2014/030219 dated Jul. 10, 2014.

(Continued)

*Primary Examiner* — Nicholas A Smith
(74) *Attorney, Agent, or Firm* — Kevin P. Radigan, Esq.; Heslin Rothenberg Farley & Mesiti P.C.

(57) ABSTRACT

Energy storage structures and fabrication methods are provided. The method include: providing first and second conductive sheet portions separated by a permeable separator sheet, and defining, at least in part, outer walls of the energy storage structure, the first and second surface regions of the first and second conductive sheet portions including first and second electrodes facing first and second (opposite) surfaces of the permeable separator sheet; forming an electrolyte receiving chamber, defined, at least in part, by the first and second surface regions, including: bonding the first and second conductive sheet portions, and the permeable separator sheet together with at least one bonding border forming a bordering frame around at least a portion of the first and second electrodes; and providing an electrolyte within the electrolyte receiving chamber, including in contact with the first and second electrodes, with the electrolyte being capable of passing through the permeable separator sheet.

22 Claims, 11 Drawing Sheets

(51) Int. Cl.

| | | |
|---|---|---|
| *H01G 11/78* | (2013.01) | |
| *H01G 11/80* | (2013.01) | |
| *H01G 11/84* | (2013.01) | |
| *H01M 10/42* | (2006.01) | |
| *H01G 9/00* | (2006.01) | |
| *H01M 2/02* | (2006.01) | |
| *H01M 4/66* | (2006.01) | |
| *H01G 11/08* | (2013.01) | |
| *H01G 11/12* | (2013.01) | |
| *H01G 11/26* | (2013.01) | |
| *H01G 11/52* | (2013.01) | |
| *H01M 10/0585* | (2010.01) | |

(52) U.S. Cl.
CPC ............ *H01G 11/12* (2013.01); *H01G 11/26* (2013.01); *H01G 11/52* (2013.01); *H01G 11/78* (2013.01); *H01G 11/80* (2013.01); *H01G 11/84* (2013.01); *H01M 2/0212* (2013.01); *H01M 2/0285* (2013.01); *H01M 4/661* (2013.01); *H01M 10/045* (2013.01); *H01M 10/0436* (2013.01); *H01M 10/0585* (2013.01); *Y02E 60/13* (2013.01); *Y10T 29/49108* (2015.01); *Y10T 29/49114* (2015.01)

(56) References Cited

U.S. PATENT DOCUMENTS

| | | | |
|---|---|---|---|
| 6,252,762 | B1 | 6/2001 | Amatucci |
| 6,517,972 | B1 | 2/2003 | Amatucci |
| 6,555,267 | B1 | 4/2003 | Broman et al. |
| 7,099,138 | B1 | 8/2006 | Togashi et al. |
| 7,218,489 | B2 | 5/2007 | Wilk et al. |
| 7,388,362 | B2 | 6/2008 | Yurgil |
| 7,554,790 | B2 | 6/2009 | James et al. |
| 7,667,438 | B2 | 2/2010 | Ashtiani et al. |
| 7,701,695 | B2 | 4/2010 | Sutardja |
| 8,134,333 | B2 | 3/2012 | Elder et al. |
| 8,334,017 | B2 | 12/2012 | Pushparaj et al. |
| 8,373,971 | B2 | 2/2013 | Young |
| 8,514,548 | B2 | 8/2013 | Miller et al. |
| 8,685,287 | B2 | 4/2014 | Worsley et al. |
| 2003/0134190 | A1* | 7/2003 | Ishida ............... H01M 2/0207 429/162 |
| 2008/0013254 | A1* | 1/2008 | Miller .................. H01G 9/016 361/502 |
| 2009/0206657 | A1 | 8/2009 | Vuk et al. |
| 2010/0028766 | A1 | 2/2010 | Peckerar et al. |
| 2011/0013344 | A1 | 1/2011 | Remizov et al. |
| 2011/0051320 | A1 | 3/2011 | Miller et al. |
| 2011/0163699 | A1 | 7/2011 | Elder et al. |
| 2011/0170236 | A1* | 7/2011 | Young ................ H01G 9/016 361/502 |
| 2011/0271855 | A1* | 11/2011 | Eilertsen ............. H01G 11/86 101/141 |
| 2011/0293993 | A1* | 12/2011 | Ryu .................... H01G 9/155 429/156 |
| 2012/0139492 | A1 | 6/2012 | Kleffel |
| 2013/0082520 | A1 | 4/2013 | Leemans et al. |
| 2013/0283847 | A1 | 10/2013 | Baumann et al. |
| 2014/0035098 | A1 | 2/2014 | Dunn et al. |
| 2014/0087214 | A1* | 3/2014 | Amatucci ............ H01G 11/22 429/11 |
| 2014/0103857 | A1 | 4/2014 | Marten |
| 2014/0154593 | A1 | 6/2014 | Rojeski |
| 2014/0167515 | A1 | 6/2014 | Feuerstack et al. |
| 2014/0184161 | A1 | 7/2014 | Deal et al. |
| 2014/0265553 | A1 | 9/2014 | McGee |
| 2014/0339902 | A1 | 11/2014 | Sepe, Jr. et al. |
| 2015/0024240 | A1 | 1/2015 | Seubert et al. |

FOREIGN PATENT DOCUMENTS

| | | |
|---|---|---|
| CN | 103339787 A | 10/2013 |
| DE | 102013201909 A1 | 8/2014 |
| EP | 1116249 A1 | 7/2001 |
| EP | 1543533 A2 | 6/2005 |
| EP | 2091055 A2 | 8/2009 |
| EP | 2459483 A2 | 6/2012 |
| EP | 2707916 A1 | 3/2014 |
| JP | 07240351 | 9/1995 |
| JP | 11016780 | 1/1999 |
| JP | 2003115423 | 4/2003 |
| JP | 2007-305306 A | 11/2007 |
| JP | 2010232574 | 10/2010 |
| JP | 2010232574 A | 10/2010 |
| JP | 2012023802 | 2/2012 |
| JP | 2012146469 A | 8/2012 |
| JP | 2013026142 | 2/2013 |
| WO | 2010120813 A2 | 10/2010 |
| WO | WO 2011/017130 A1 | 2/2011 |
| WO | 2012021154 A1 | 2/2012 |
| WO | WO 2012/021154 A1 | 2/2012 |
| WO | 2012125968 A1 | 9/2012 |

OTHER PUBLICATIONS

Mehta et al., "Supercapacitor Structures", U.S. Appl. No. 13/041,624, filed Sep. 30, 2013 (39 pages).

Mehta et al., Supplementary Partial European Search Report for EP14765784.6, dated Nov. 18, 2016 (2 pages).

\* cited by examiner

ENERGY STORAGE STRUCTURES AND FABRICATION METHODS THEREOF

CROSS-REFERENCE TO RELATED APPLICATIONS

This application claims priority from U.S. provisional patent application Ser. No. 61/801,206, filed Mar. 15, 2013, which is hereby incorporated herein by reference in its entirety. In addition, this application claims priority from U.S. provisional patent application Ser. No. 61/884,324, filed Sep. 30, 2013, which is hereby incorporated herein by reference in its entirety.

FIELD OF THE INVENTION

The present invention relates to energy storage structures and methods of fabricating energy storage structures, and more particularly to enhanced, flexible energy storage structures and fabrication methods thereof.

BACKGROUND OF THE INVENTION

One of the key goals of the electronics industry has been to reduce the size of electronic devices such as smart phones, computers, and cameras, even as performance, feature, and power requirements of those devices increase. Typically, a significant portion of the size and bulk of electronic devices has been used by power subsystems, including, for example, batteries and capacitors.

BRIEF SUMMARY

The shortcomings of the prior art are overcome, and additional advantages are provided, through the provision, in one aspect, of a method which includes: fabricating an energy storage structure, the fabricating including: providing a first conductive sheet portion and a second conductive sheet portion separated by a permeable separator sheet, the first conductive sheet portion and the second conductive sheet portion defining, at least in part, outer walls of the energy storage structure, wherein a first surface region of the first conductive sheet portion includes a first electrode facing a first surface of the permeable separator sheet and a second surface region of the second conductive sheet portion includes a second electrode facing a second surface of the permeable separator sheet, the first surface and the second surface of the permeable separator sheet being opposite surfaces thereof; forming an electrolyte receiving chamber, the electrolyte receiving chamber being defined, at least in part, by the first surface region of the first conductive sheet portion and the second surface region of the second conductive sheet portion, and the forming including: bonding the first conductive sheet portion, the second conductive sheet portion, and the permeable separator sheet together with at least one bonding border, the at least one bonding border forming a bordering frame around at least a portion of the first electrode and the second; and providing an electrolyte within the electrolyte receiving chamber, including in contact with the first electrode and the second electrode, wherein the electrolyte is capable of passing through the permeable separator sheet.

In another aspect, a structure is presented. The structure includes: an energy storage structure, the energy storage structure including: a first conductive sheet portion and a second conductive sheet portion separated by a permeable separator sheet, the first conductive sheet portion and the second conductive sheet portion defining, at least in part, outer walls of the energy storage structure, wherein a first surface region of the first conductive sheet portion includes a first electrode facing a first surface of the permeable separator sheet and a second surface region of the second conductive sheet portion comprises a second electrode facing a second surface of the permeable separator sheet, the first surface and the second surface of the permeable separator sheet being opposite surfaces thereof; an electrolyte receiving chamber, the electrolyte receiving chamber being defined, at least in part, by the first surface region of the first conductive sheet portion and the second surface region of the second conductive sheet portion, and the electrolyte receiving chamber including: at least one bonding border, the at least one bonding border bonding the first conductive sheet portion, the second conductive sheet portion, and the permeable separator sheet together, and forming a bordering frame around at least a portion of the first electrode and the second electrode; and an electrolyte within the electrolyte receiving chamber, including in contact with the first electrode and the second electrode, wherein the electrolyte is capable of passing through the permeable separator sheet.

In another aspect a method of fabricating an energy storage structure is presented. The method includes providing a multi-cell energy storage structure, wherein one or more outer surfaces of the multi-cell energy storage structure include at least one conductive sheet facilitating defining at least one energy storage cell of the multi-cell energy storage structure.

In a further aspect, a structure is presented. The structure includes: an energy storage structure, the energy storage structure including: a battery, the battery including a first conductive tab; an ultra-capacitor structure, the ultra-capacitor structure including a second conductive tab; and an insulating pouch, the insulating pouch surrounding the battery and the ultra-capacitor, wherein the first conductive tab and the second conductive tab extend outward from the insulating pouch.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
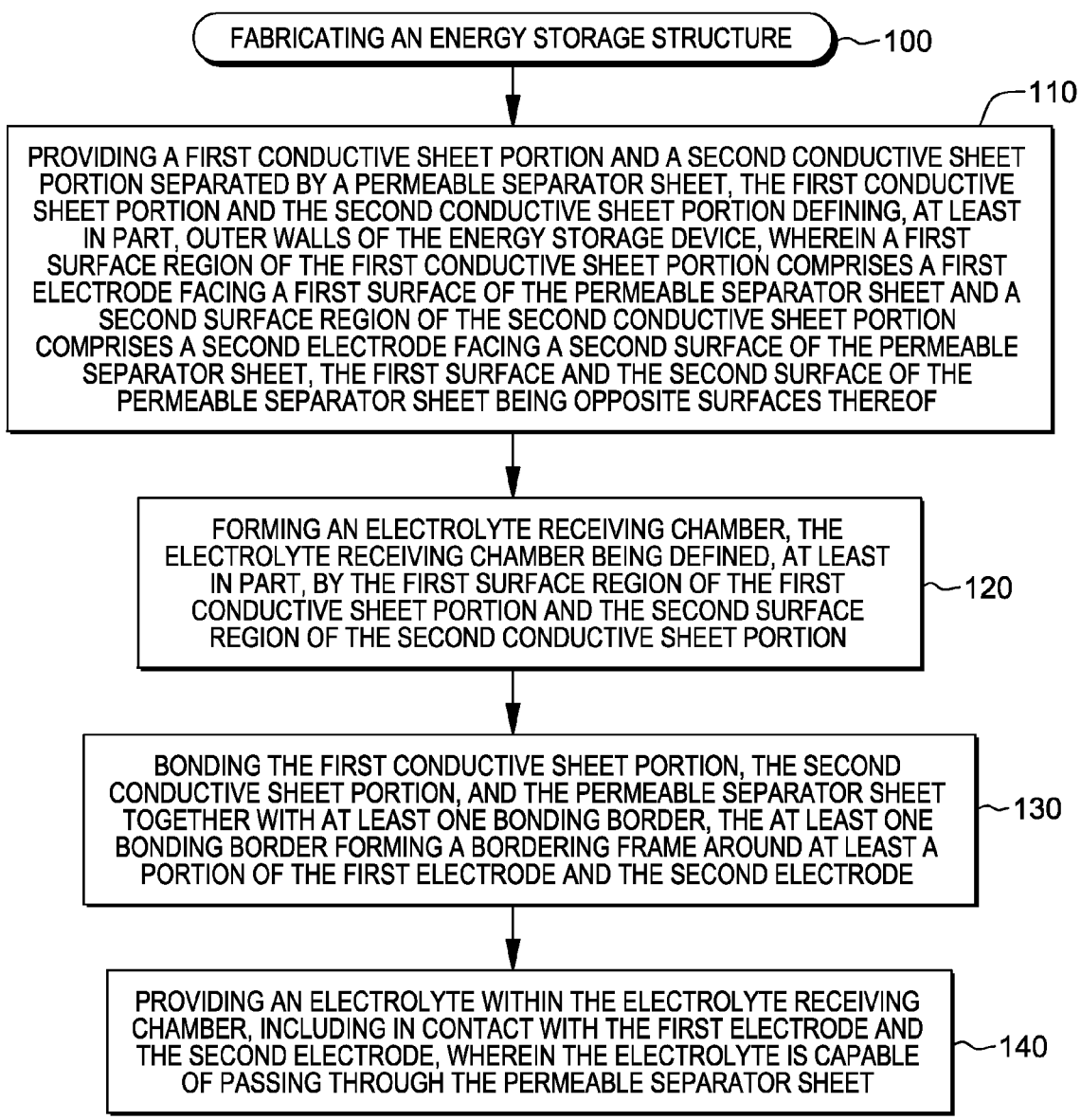
FIG. 1 depicts one process embodiment for fabricating an energy storage structure, in accordance with one or more aspects of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, energy storage structures and fabrication methods thereof. An energy storage structure may be, for example, an ultra-capacitor, a capacitor, battery, fuel cell, any other device or structure capable of storing energy, or any combination thereof. As used herein, an "ultra-capacitor" is, for instance, an electrochemical capacitor that includes an electrolyte disposed between electrodes. An electrolyte is, for example, a substance, which may be a liquid, through which electricity may pass. In another example, an electrolyte may be a solid or semisolid, flowable material. One example of an ultra-capacitor is an electrochemical double layer capacitor (EDLC), which stores electrical energy by, for example, the separation of charge, for instance, in a double layer of ions, at the interface between the surface of a conductive electrode and an electrolyte. Another term for an ultra-capacitor is a supercapacitor.

Energy storage devices may be characterized by an energy density and a power density. The energy density (also known as the specific energy) of an energy storage device is defined as the amount of energy stored per unit mass of the device, and the power density is defined as the rate per unit mass at which energy may be transferred to or from the device. Different types of energy storage devices may be compared by comparing their respective energy densities and power densities. As one example, an activated carbon ultra-capacitor may have, for example one-tenth of the energy density of a conventional lithium-ion rechargeable battery, but have, for example, 10 to 100 times the power density of the conventional lithium-ion rechargeable battery.

Generally stated, provided herein, in one aspect, is a structure including an energy storage structure. The energy storage structure includes: a first conductive sheet portion and a second conductive sheet portion separated by a permeable separator sheet, the first conductive sheet portion and the second conductive sheet portion defining, at least in part, outer walls of the energy storage structure, wherein a first surface region of the first conductive sheet portion includes a first electrode facing a first surface of the permeable separator sheet and a second surface region of the second conductive sheet portion comprises a second electrode facing a second surface of the permeable separator sheet, the first surface and the second surface of the permeable separator sheet being opposite surfaces thereof; an electrolyte receiving chamber, the electrolyte receiving chamber being defined, at least in part, by the first surface region of the first conductive sheet portion and the second surface region of the second conductive sheet portion, and the electrolyte receiving chamber including: at least one bonding border, the at least one bonding border bonding the first conductive sheet portion, the second conductive sheet portion, and the permeable separator sheet together, and forming a bordering frame around at least a portion of the first electrode and the second; and an electrolyte within the electrolyte receiving chamber, including in contact with the first electrode and the second electrode, wherein the electrolyte is capable of passing through the permeable separator sheet.

In one embodiment, the first conductive sheet portion and the second conductive sheet portion may be part of a common conductive sheet, the common conductive sheet being folded to substantially align the first conductive sheet portion and the second conductive sheet portion substantially with the permeable separator sheet therebetween.

In another embodiment, the structure further includes multiple energy storage structures, the multiple energy storage structures comprising multiple first conductive sheet portions of a common conductive sheet separated from multiple second conductive sheet portions of the common conductive sheet by a common line of symmetry, wherein the common conductive sheet is folded along the common line of symmetry to substantially align the multiple first conductive sheet portions and the multiple second conductive sheet portions substantially with the permeable separator sheet therebetween.

In a further embodiment, the structure further includes at least one conductive tab electrically connected to and extending outward from at least one of the first conductive sheet portion or the second conductive sheet portion.

In one implementation, the energy storage structure is a flexible energy storage structure capable of being bent at any angle. In another implementation, the bordering frame is (or includes) an electrical insulator, the electrical insulator electrically isolating the first conductive sheet portion from the second conductive sheet portion. In a further implementation the bordering frame provides a fluid-tight seal around the electrolyte receiving chamber and is or includes a chemically resistant material, the chemically resistant material inhibiting leakage from the electrolyte receiving chamber.

In one example, the bonding border comprises using a flowable material. In such a case, the flowable material may be an epoxy material. In another example, the bonding border comprises a pressure sensitive adhesive. In a further example, the structure includes at least one conductive tab electrically connected to and extending outward from at least one of the first conductive sheet portion or the second conductive sheet portion.

In another aspect, an energy storage structure is presented. The energy storage structure includes: a battery, the battery including a first conductive tab; an ultra-capacitor structure, the ultra-capacitor structure including a second conductive tab; and an insulating pouch, the insulating pouch surrounding the battery and the ultra-capacitor, wherein the first conductive tab and the second conductive tab extend outward from the insulating pouch.

Reference is made below to the drawings, which are not drawn to scale for ease of understanding, wherein the same reference numbers used throughout different figures designate the same or similar components.

FIG. 1 illustrates one or more embodiments of a process for fabricating an energy storage structure 100, in accordance with one or more aspects of the present invention. As illustrated in FIG. 1, the fabricating includes: providing a first conductive sheet portion and a second conductive sheet portion separated by a permeable separator sheet, the first conductive sheet portion and the second conductive sheet portion defining, at least in part, outer walls of the energy storage structure, wherein a first surface region of the first conductive sheet portion includes a first electrode facing a first surface of the permeable separator sheet and a second surface region of the second conductive sheet portion includes a second electrode facing a second surface of the permeable separator sheet, the first surface and the second surface of the permeable separator sheet being opposite surfaces thereof 110; forming an electrolyte receiving chamber, the electrolyte receiving chamber being defined, at least in part, by the first surface region of the first conductive sheet portion and the second surface region of the second conductive sheet portion 120, and the forming including: bonding the first conductive sheet portion, the second conductive sheet portion, and the permeable separator sheet together with at least one bonding border, the at least one bonding border forming a bordering frame around at least a portion of the first electrode and the second electrode 130; and providing an electrolyte within the electrolyte receiving chamber, including in contact with the first electrode and the second electrode, wherein the electrolyte is capable of passing through the permeable separator sheet 140. In another embodiment, the method includes providing a multi-cell energy storage structure, wherein one or more outer surfaces of the multi-cell energy storage structure comprise at least one conductive sheet facilitating defining at least one energy storage cell of the multi-cell energy storage structure In one example, the bonding comprises using a flowable material in forming the bonding border. In such an example, the flowable material could include an epoxy material. In another example, the bonding border includes a pressure sensitive adhesive.

In one embodiment, providing the first conductive sheet portion and the second conductive sheet portion includes coating the first surface region and the second surface region with a common electrode material to form the first electrode and the second electrode. In another embodiment, the at least one bonding border facilitates spacing the permeable separator sheet apart from both the first conductive sheet portion and the second conductive sheet portion. In a further embodiment, the bordering frame provides a fluid-tight seal around the electrolyte receiving chamber and includes a chemically resistant material, the chemically resistant material inhibiting leakage from the electrolyte receiving chamber.

In one implementation, the method includes providing at least one conductive tab electrically connected to and extending outward from at least one of the first conductive sheet portion or the second conductive sheet portion. In another implementation, the bordering frame comprises an electrical insulator, the electrical insulator electrically isolating the first conductive sheet portion from the second conductive sheet portion. In another implementation, the bonding comprises heating the bonding border to bond the first conductive sheet portion, the second conductive sheet portion, and the permeable separator sheet together. In a further implementation, the bonding comprises applying pressure to the bonding border to bond the first conductive sheet portion, the second conductive sheet portion, and the permeable separator sheet together.

Figure 2A:
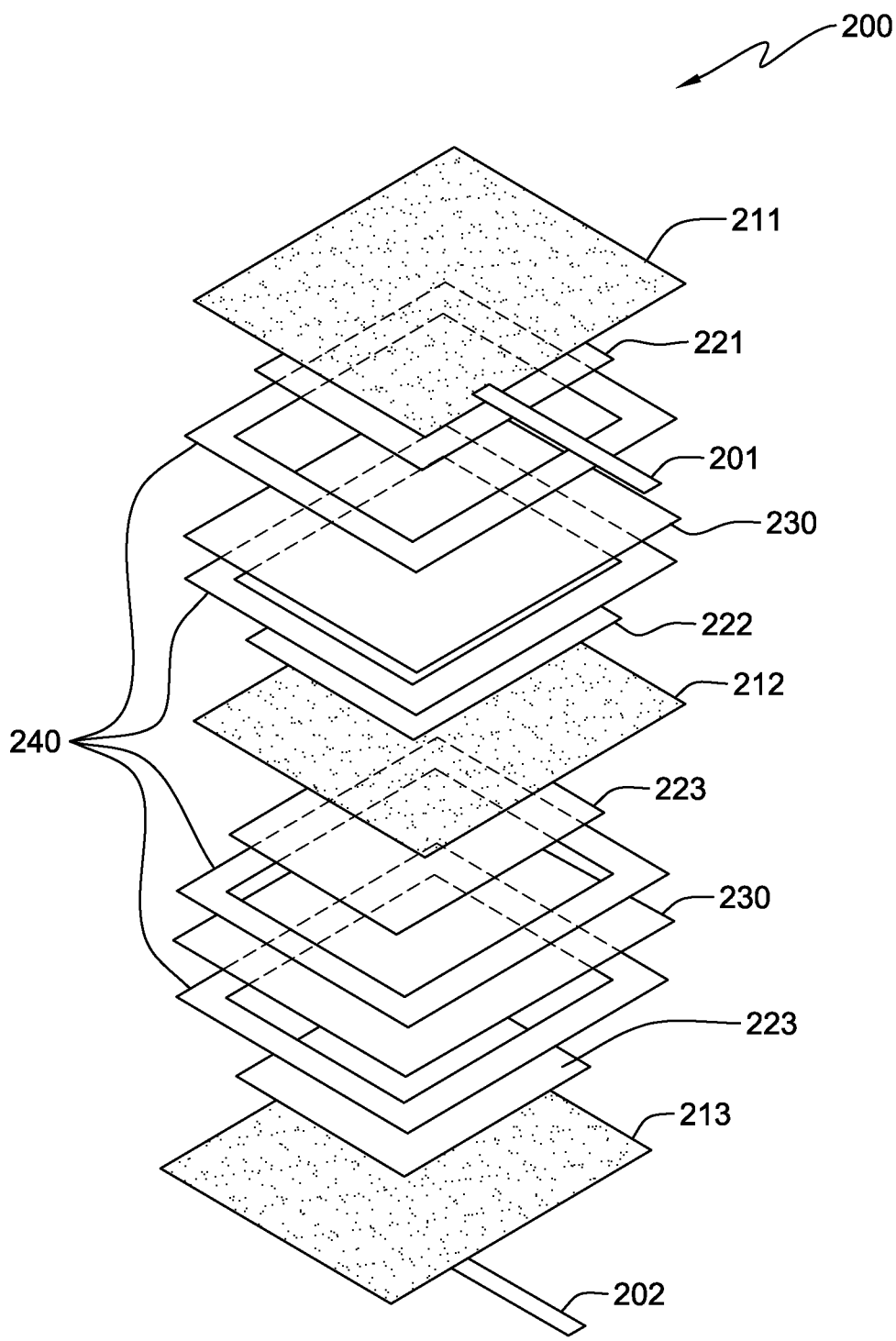
FIGS. 2A & 2B are exploded views of energy storage structures, in accordance with one or more aspects of the present invention.
Figure 2B:
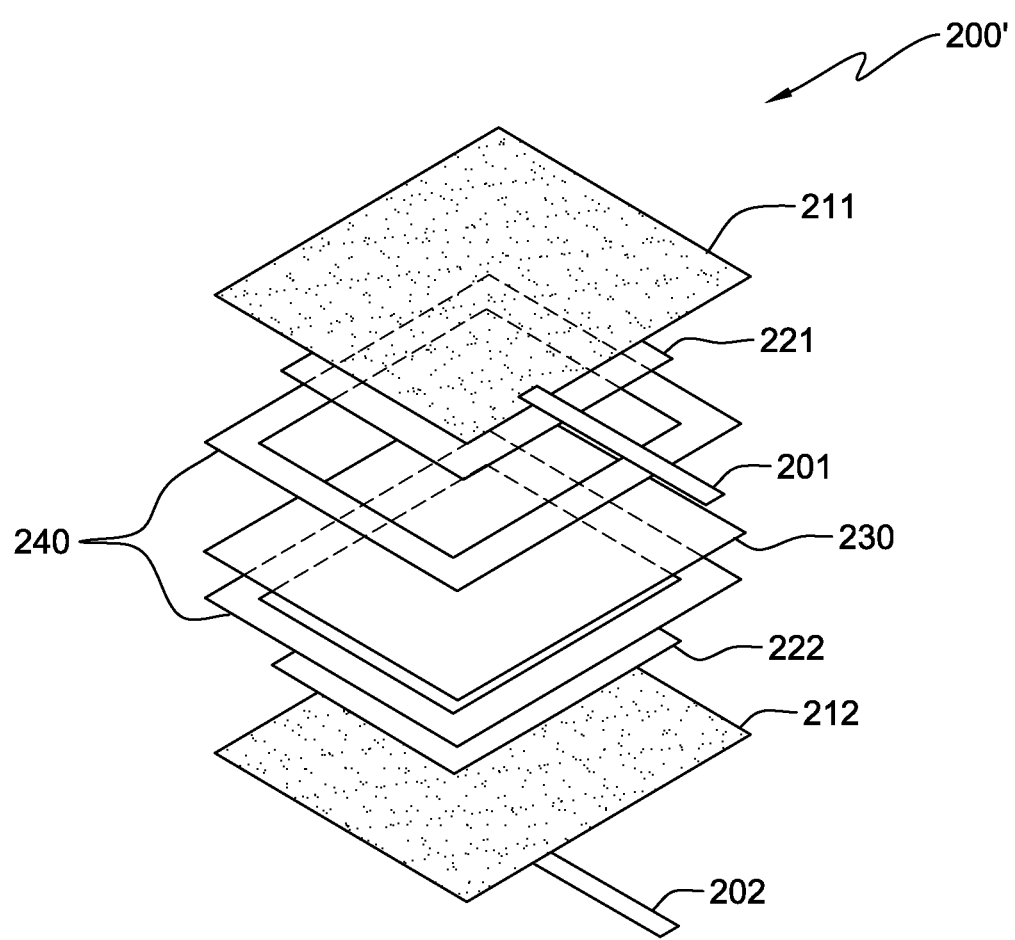

FIGS. 2A & 2B are exploded views of embodiments of an energy storage structure 200, in accordance with one or more aspects of the present invention. As shown in FIG. 2A, energy storage structure 200 includes at least one conductive tab 201, 202, electrically connected to and extending from conductive sheet portions 211, 213 of the structure. These conductive tabs may be used in the transfer of energy into energy storage structure 200 for storage or to release energy. In the example depicted, a conductive tab 201 is electrically connected to, and extends outward from, a first conductive sheet portion 211, and a conductive tab 202 is electrically connected to, and extends outward from, a third conductive sheet portion 213. In other examples, another conductive tab may extend outward from a second conductive sheet portion 212.

The conductive sheet portions function as current collectors, and may be or include metal foils, including, for example, aluminum foil. The conductive sheet portions may be any suitable metal, for example, copper (Cu), silver (Ag), gold (Au), platinum (Pt), nickel (Ni), chromium (Cr), or may be a conducting oxide. In one example, the conductive sheet portions have a thickness of between 1 to 100 microns, depending upon the electrochemistry used within the energy storage structure. In cases where the conductive sheet is not required for mechanical stability of the entire energy structure or one or more of its electrodes, the thickness may be between 1 to 3 microns, for example. Where the conductive sheet is required for either or both the mechanical stability of the entire energy storage structure or one or more of its electrodes, the thickness may be between 3 to 25 microns depending on external factors, such as flexing, bending, mechanical shock, or vibration. In one specific example, the conductive sheet portions are between 5 and 15 microns in thickness.

Advantageously, as illustrated in this exploded view, each component of energy storage structure 200 is a thin sheet of flexible material that may be bent or folded as needed. Taken together, energy storage structure 200 is itself flexible, and may be bent or folded over at any angle.

The placement of conductive tabs provides access to different voltage levels of energy storage structure 200, and allows connection of energy storage structure 200 to various devices, such as electronic devices, including smart phones, cameras, mobile phones, pace makers, insulin pumps, etc. The conductive tabs may be, in one example, portions of a common conductive sheet, from which continuous conductive sheet portions and conductive tabs may be formed. In another example, the conductive tabs may be separate portions that are attached, by, for example, welding, soldering, bonding with conductive epoxy, wire bonding, etc., to the conductive sheet portions. Energy storage structure 200 may itself be replicated and stacked alongside or on top of one another, with connections being made to connect several structures in series or parallel as desired, and may include logic switches and circuitry for balancing networks of structures.

Significant advantages are offered by such configurations, because, in the illustrated example of FIG. 2A, the outermost sheets, first conductive sheet portion 211, and third conductive sheet portion 213 are conductive, the entire outer surfaces of energy storage structure 200 may be used to establish electrical contact with components of an electronic device, greatly simplifying the design of such an electronic device, by allowing contact on any surface of energy storage structure 200. For example, first conductive sheet portion 211 may be a ground plane, allowing connection to multiple components, and second conductive.

Continuing with FIG. 2A, in the illustrated embodiment, first conductive sheet portion 211 and second conductive sheet portion 212 are separated by a permeable separator sheet 230. In this embodiment, a first surface region of first conductive sheet portion 211 includes a first electrode 221, and a second surface region of second conductive sheet portion 212 includes a second electrode 222. First electrode 221 faces a first surface of permeable separator sheet 230, and second electrode 222 faces a second surface of permeable separator sheet 230, which as depicted are opposite surfaces of permeable separator sheet 230. Permeable separator sheet 230 is porous insulating sheet designed to prevent first electrode 221 and second electrode 222 from directly electrically contacting each other.

Electrodes 221, 222 may be fabricated of a porous, or spongy, material, which may have a large specific surface area (such as activated carbon, amorphous carbon, carbon aerogel, graphene, or carbon nanotubes). The electrodes may be symmetric and comprise various carbons or they may be asymmetric electrodes such that the negative electrode may include nickel manganese chloride (NMC) or nickel cobal aluminum (NCA), or lithium salts such as lithium cobalt and other cathode materials or metal oxides. The positive or negative carbon electrode may also contain materials that increase voltage, such as fluoride or lithium metals. In one example, electrodes 221, 222 may have a specific surface area of 500-2000 square meters per gram, due to micro-porosity.

In the depicted embodiment, the first surface region of first conductive sheet portion 211 and the second surface region of second conductive sheet portion 212 define, at least in part, an electrolyte receiving chamber. As described below, an electrolyte is to be provided within the electrolyte receiving chamber, including in contact with, for example, first electrode 221 and second electrode 222. The electrolyte may be selected to be capable of passing through permeable separator sheet 230, and may be or include a solvent with dissolved chemicals, such as potassium hydroxide (KOH). Electrolytes could be water based ionic liquids such as KOH, NaOH, sulfuric acid, etc., or organic electrolytes such as triethylmethylammonium tetrafluoroborate (TEMABF4) or tetraethyl ammonium tetrafluoroborate (TEABF4) in various solvents such as acitonitre, polycarbonate dimethyl carbonate, etc., or a mixture thereof. In another embodiment, the electrolyte may be a semi-solid or solid material, and may serve a dual role as a dielectric or insulator, serving to separate the two electrodes.

In one implementation, the electrolyte receiving chamber may be formed by bonding first conductive sheet portion 211, second conductive sheet portion 212, and permeable separator sheet 230 with at least one bonding border 240. In such an example, bonding border(s) 240 can form a bordering frame around at least a portion of first electrode 221 and second electrode 222, facilitating spacing permeable separator sheet 230 apart from both first conductive sheet portion 211 and second conductive sheet portion 212. After, for instance, the electrolyte is provided within the electrolyte receiving chamber, the electrolyte itself, in conjunction with the bordering frame, function to space apart first conductive sheet portion 211 and second conductive sheet portion 212, which as noted may be fabricated as thin flexible foils. Advantageously, the bordering frame is provided to establish a fluid-tight (e.g., hermetic) seal around the electrolyte receiving chamber, and inhibit electrolyte leakage from the electrolyte receiving chamber.

Bonding border 240 may each be, for example, formed from a layer of an electrical insulator. In such an example, the electrical insulator operates to electrically isolate first conductive sheet portion 211 from second conductive sheet portion 212. In one example, the electrical insulator is a dielectric material. In another example, the bonding border may be formed using a flowable material, such as an epoxy material, or may be formed using pressure sensitive adhesives, thermoplastics, hot melt mixes, etc.

Advantageously, because of the use of bonding border 240, energy storage structure 200 does not require an external pouch or insulating sleeve. Instead, the integrally required components of energy storage structure 200 are themselves used to create its packaging. This "pouch-less" design eliminates the thickness of pouch or packaging materials, allowing for energy storage structure 200 to have an extremely thin profile. For example, in an embodiment where the thickness of bonding border 240 is less than a thickness of permeable separator sheet 240 and electrodes 221, 222, the techniques described herein allow for energy storage device to have no additional added thickness due to its packaging. This is because bonding border 240 occupies the same or less vertical height of the above noted required structures.

In the illustrated example of FIG. 2A, the structures between first conductive sheet portion 211 and second conductive sheet portion 212, are mirrored between second conductive sheet portion 212 and third conductive sheet portion 213. For example, a third surface region of third conductive sheet portion 213 includes a third electrode 223, which faces a surface of another permeable separator sheet 230. By mirroring the structures between (shared) second conductive sheet 212 and third conductive sheet portion 213, the energy storage structure of FIG. 2A depicts two ultra-capacitor cells, in a stacked bipolar configuration.

A stacked bipolar configuration offers certain advantages, because different voltage levels may be accessed by contacting different conductive sheet portions. In one example, the stacked cells may be connected in series. In another example, the stacked cells may be accessible connected in parallel. For example, if each of the two cells described in FIG. 2A is capable of storing 2.7 volts (V), then, in one example, first conductive sheet portion 211 may be a ground plane, at zero volts, second conductive sheet portion 212 may store or deliver 2.7 V (e.g., one cell), and third conductive sheet portion 213 may store or deliver 5.4 V (e.g., two cells). In another example, each cell may be separately accessible, as for example, a 2.7 V cell. As may be understood, the stacked configuration may be repeated to include three, four, or any number of cells stacked in a manner similar to that described for two cells, which may be connected in series, parallel, or some other manner to deliver required voltage and power levels.

FIGS. 3-7 illustrate various aspects and embodiments of flexible energy storage structures using bonding borders, to demonstrate a subset of the wide variety of embodiments which may employ the techniques of the present invention. In the figures to be described below, three digit reference numbers having the same last two digits as the 200 series reference numbers used with respect to FIG. 2A will refer to the same or similar parts. For example, reference numbers 311, 411, etc., will refer to the same or similar parts as reference number 211 refers to with respect to FIG. 2A, e.g., a first conductive sheet portion.

Figure 3:
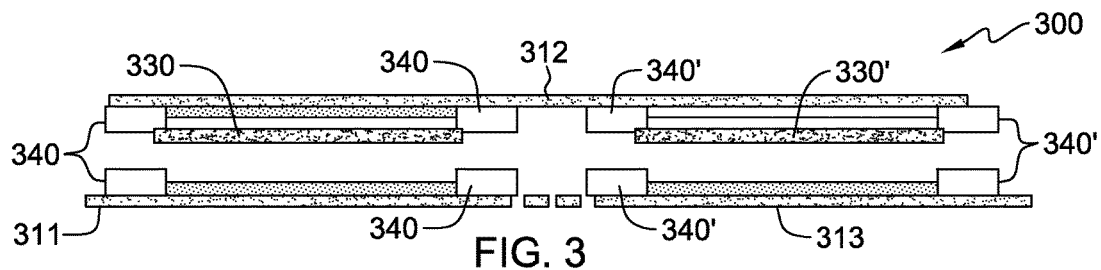
FIG. 3 is a cross-sectional elevational view of an energy storage structure in an intermediate stage of fabrication, in accordance with one or more aspects of the present invention.

FIG. 3 is a cross-sectional elevational view of an energy storage structure 300 during an intermediate stage of fabrication, in accordance with one or more aspects of the present invention. In the illustrated embodiment, a second conductive sheet portion 312 is shared between two cells of energy storage structure 300. In this embodiment, a first conductive sheet portion 311 and a second conductive sheet portion 312 form a first cell, and second conductive sheet portion 312 and a third conductive sheet portion 313 form a second cell. Advantageously, in such a configuration, a first voltage level from one cell may be electrically obtained by contacting, for example, first conductive sheet portion 312, and a combined series voltage of a second level may be obtained by contacting both cells via, for example, second conductive sheet portion 311. As illustrated in FIG. 3, two bonding borders 340 may be overlapped in such a structure by respective permeable separator sheets 330, 330' to facilitate formation of the respective electrolyte receiving chambers. Bonding borders 340, in this example, trap and seal the respective permeable separator sheets 330, 330'.

In one embodiment, energy storage structure 300 can be used, as illustrated, in a co-planar, or flat, configuration. In another embodiment, to reduce device footprint, energy storage structure 300 may be folded in half midway along conductive sheet portion 312. The fold can occur either such that conductive sheet portion 312 ends up back-to-back on the inside of the resulting structure, or folded in the opposite orientation such that conductive sheet portion 312 is on the outside. In one example, energy storage structure 300 is folded such that conductive sheet portion 312 is on the outside, and an electrically isolating material is be added to between the conductive sheet portions to prevent them from coming into contact with each other. Regardless of the orientation in which the structure is folded, a material which is either heat bondable such as polypropylene (PP) or polyethylene (PE), pressure-sensitive such as a PSA, or adhesive such as epoxy film, can be used between the inner surfaces to keep the structure permanently folded. Electrolyte filling of each compartment can occur while the structure is flat or after having been folded. To facilitate fitting the structure into various applications, energy storage structure 300 can be bent midway along conductive sheet portion 312 at any angle between −180 degrees to +180 degrees.

Figure 4:
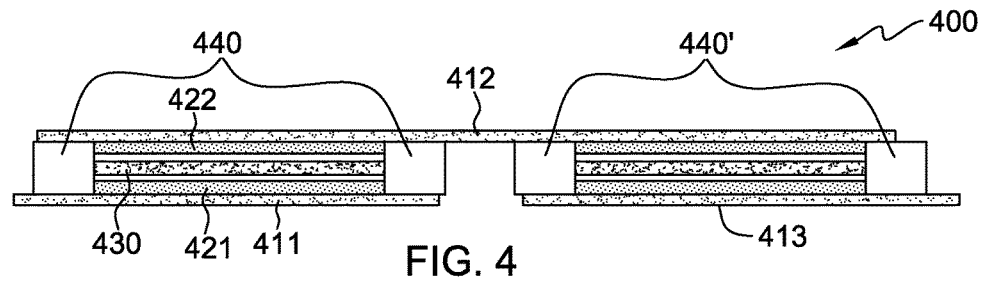
FIG. 4 depicts one embodiment of a further energy storage structure, in, accordance with one or more aspects of the present invention.

FIG. 4 depicts one embodiment of another energy storage structure 400, in accordance with one or more aspects of the present invention. In the illustrated embodiment, a first conductive sheet portion 411, a second conductive sheet portion 412, and a permeable separator sheet 430 may be bonded together with a single bonding border 440. In this example, permeable separator sheet 430 does not overlap bonding border 440, and is instead sized and configured to match the footprints of a first electrode 421 and a second electrode 422.

Figure 5:
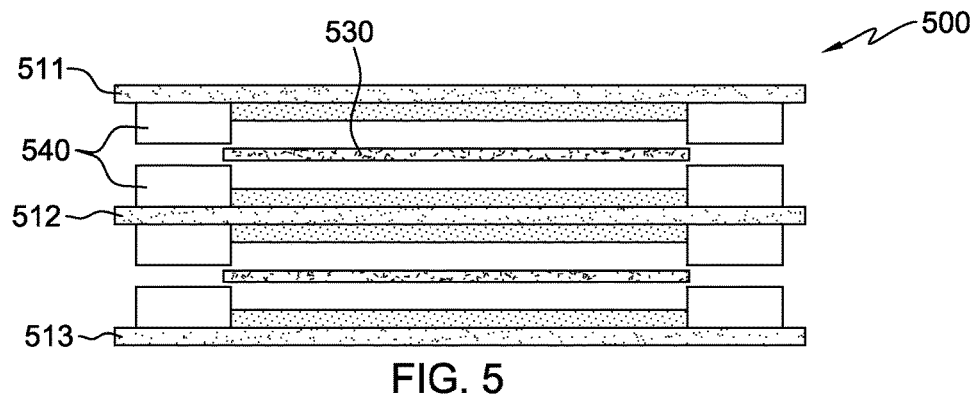
FIG. 5 depicts another embodiment of an energy storage structure, in accordance with one or more aspects of the present invention.

FIG. 5 depicts another embodiment of an energy storage structure 500, in accordance with one or more aspects of the present invention. In this embodiment, energy storage structure 500 is a stacked bipolar ultra-capacitor. A bipolar energy storage structure such as depicted includes two cells, and in the illustrated embodiment, the cells are stacked together in an electrical series configuration. A first cell of the stacked bipolar ultra-capacitor is defined by a first conductive sheet portion 511, a second conductive sheet portion 512, with remaining energy storage structure components therebetween. A second cell of the stacked bipolar ultra-capacitor is defined by second conductive sheet portion 512, a third conductive sheet portion 513, and the other noted structures therebetween. In such a configuration, second conductive sheet portion 512 is shared by both the first and second cells of the ultra-capacitor, enabling the electrical series connection between the cells. As depicted, at least one bonding border 540 bonds together first conductive sheet portion 511, second conductive sheet portion 512, and a permeable separator sheet 530 in the first cell. Similarly, at least one bonding border 540 bonds together second conductive sheet portion 512, third conductive sheet portion 513, and a permeable separator sheet 530 in the second cell.

As noted above, the package-less design of, for example, energy storage structure 500 offers several advantages. As one advantage, conductive sheet portions 511, 513, are accessible at the top and bottom of energy storage structure 500, and electrical contact may be made at any point or surface thereon. A thin sealant layer may be applied to conductive sheet portions 511, 513, to prevent unwanted electrical contact, if necessary. As a further advantage, the use of bonding border 540 in forming a bordering frame around electrodes seals energy storage structure 500 without adding any additional thickness, because bonding border 540, in the embodiment described, may be thinner than the space needed for the electrolyte receiving chamber. Sharing this vertical space allows an elimination of thickness in energy storage structure 500.

Figure 6:
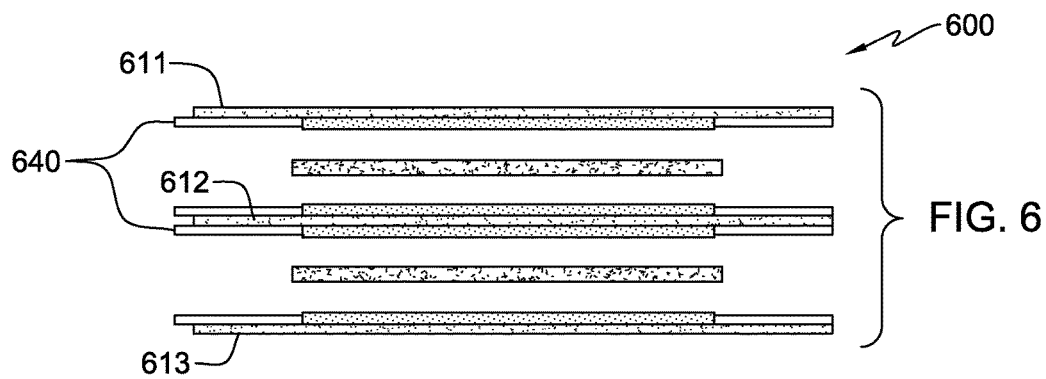
FIG. 6 depicts a further embodiment of an energy storage structure, in accordance with one or more aspects of the present invention.

FIG. 6 depicts a further embodiment of an energy storage structure 600 in an intermediate stage of fabrication, in accordance with one or more aspects of the present invention. Energy storage structure 600 includes at least one bonding border 640. By comparison with the at least one bonding border 540 of energy storage structure 500, the at least one bonding border 640 has a thinner profile. Different thicknesses of bonding borders may facilitate differently sized electrolyte receiving chambers for the different energy storage structures, and may also allow for different storage structure thicknesses, enabling various applications thereof.

Figure 7A:
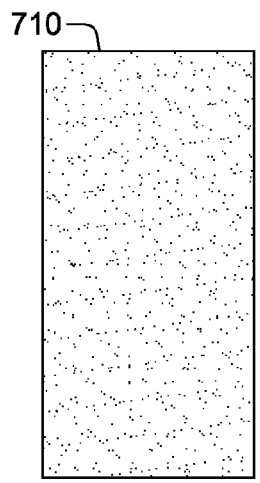
FIG. 7A depicts a conductive sheet portion(s), in accordance with one or more aspects of the present invention.
Figure 7B:
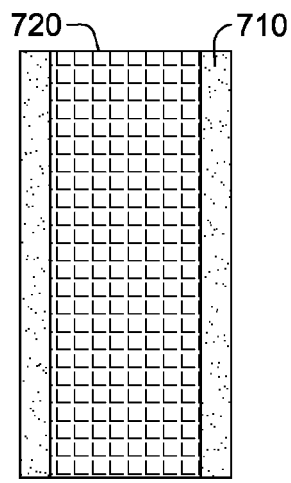
FIG. 7B depicts the conductive sheet portion(s) of FIG. 7A after coating a surface region(s) thereof with a common electrode material, in accordance with one or more aspects of the present invention.
Figure 7C:
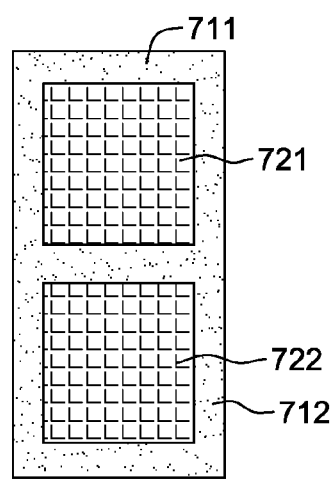
FIG. 7C depicts the conductive sheet portion(s) of FIG. 7B after defining an electrode(s), in accordance with one or more aspects of the present invention.

FIGS. 7A-7H illustrate various embodiments of a process for fabricating an energy storage structure, in accordance with one or more aspects of the present invention. FIG. 7A depicts providing a common conductive sheet 710 which may be a flexible foil such as discussed above. As depicted in FIG. 7B, an electrode coating 720 may be applied to common conductive sheet 710. Electrode coating 720 may be, for example, a carbon electrode coating. In the example depicted, a continuous stripe of electrode coating has been applied to common conductive sheet 710. As depicted in FIG. 7C, portions of the electrode coating may be stripped from the common conductive sheet to form a first electrode 721 and a second electrode 722. In another example, an intermittent or skip coating process may be used to apply electrode coating to common conductive sheet 710 to obtain the structure of FIG. 7C. In the illustrated embodiment, a first surface region of a first conductive sheet portion 711 includes first electrode 721, and a second surface region of a second conductive sheet portion 712 includes second electrode 722.

Figure 7D:
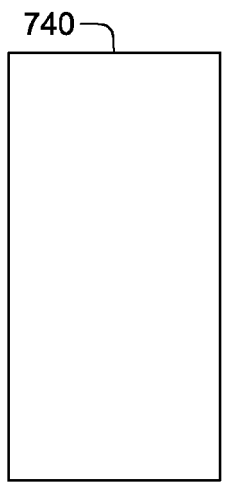
FIG. 7D depicts a sheet of material for forming at least one bonding border, in accordance with one or more aspects of the present invention.
Figure 7E:
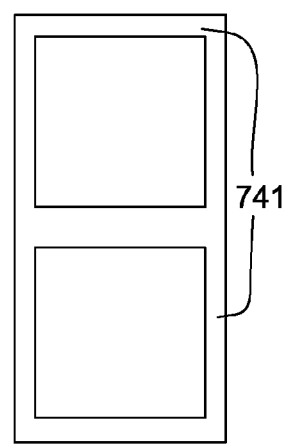
FIG. 7E depicts at least one bonding border formed from the sheet of material of FIG. 7D, in accordance with one or more aspects of the present invention.
Figure 7F:
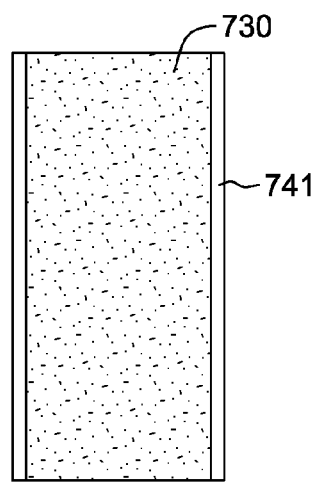
FIG. 7F depicts a permeable separator sheet overlying the at least one bonding border of FIG. 7E, in accordance with one or more aspects of the present invention.
Figure 7G:
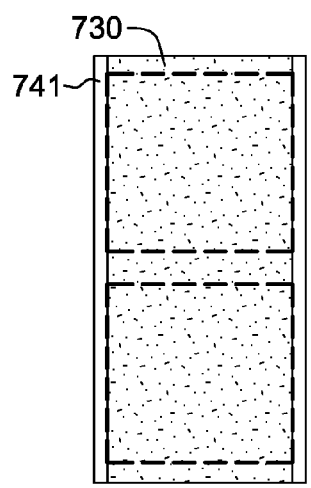
FIG. 7G identifies certain regions of the permeable separator sheet of FIG. 7F, in accordance with one or more aspects of the present invention.

FIG. 7D illustrates a sheet of material 740 for forming at least one bonding border. As depicted in FIG. 7E, at least one bonding border 741 may be formed from the sheet of material by cutting or etching openings in the material. As shown in FIG. 7F, a permeable separator sheet 730 may be provided with the at least one bonding border 741. As labeled in FIG. 7G, different regions of permeable separator sheet 730 may be identified as overlying the openings (see FIG. 7E) in the at least one bonding border 741. Material of permeable separator sheet 730 may be removed, as illustrated in FIG. 7H, to define permeable separator sheet 741 overlying principally the openings in the at least one bonding border 741.

Figure 7H:
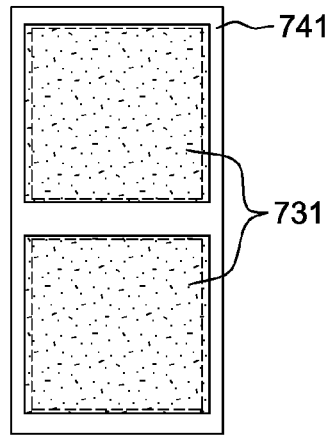
FIG. 7H depicts another embodiment of a permeable separator sheet(s) together with the at least one bonding border of FIG. 7E, in accordance with one or more aspects of the present invention.

The structure of FIG. 7C, including the first conductive sheet portion (and the first electrode) and the second conductive sheet portion (and the second electrode), may then be bonded with the structure of FIG. 7H, which includes the permeable separator sheet and the at least one bonding border. In such a case, the at least one bonding border forms bordering frames around the first electrode and the second electrode, to define the desired electrochemical structure. Such a structure may then be used, through folding, or the addition of other sheets, in conjunction with an appropriate electrolyte, to form energy storage structures.

FIGS. 8A-8J depict embodiments of a process for concurrently fabricating multiple energy storage structures, in accordance with one or more aspects of the present invention. With reference to these figures, a process for forming an inverted bipolar cell is described. In the embodiments depicted, a belt laminating machine may be used to fabricate multiple energy storage structures in a continuous process. As described below, in a belt lamination process, a carrier film may be fed into the belt laminator, which ensures that pieces, such as bonding borders, conductive sheet portions, sealant sheets, etc., placed on top of the carrier film will not shift during the lamination process. The pieces may then be bonded together by the belt laminator, using a combination of pressure and/or temperature treatment. This can allow, for example, the use of pressure sensitive adhesives (PSA) or heat bondable materials such as PP or PE in forming energy storage structures. Discrete pieces may be aligned and placed on a carrier film, or a structural element may itself be used as a carrier film. In one example, a belt laminator may include heated belts, to facilitate pre-heating of various materials. In another example, a belt laminator may include adjustable settings to allow various pressure levels or temperatures to be applied to the materials.

Figure 8A:
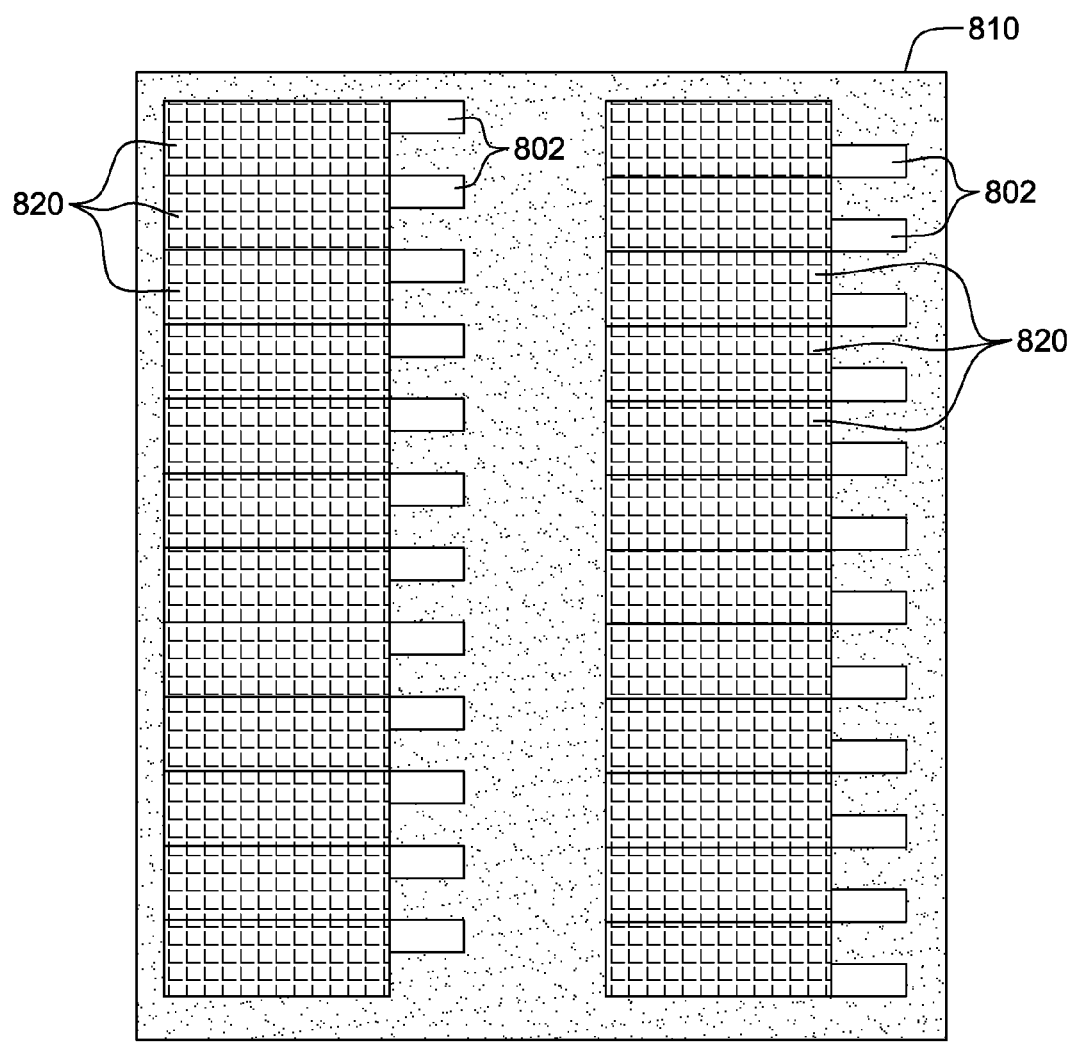
FIGS. 8A-8J depict embodiments of a process for fabricating multiple energy storage structures, in accordance with one or more aspects of the present invention.

As illustrated in FIG. 8A a common conductive sheet 810 may be strip coated, screen printed, or coated by various other deposition techniques, with an electrode material to form multiple electrodes 820 on common conductive sheet 810, using, for example, the processes described with respect to FIGS. 7A-7C. Multiple conductive tabs 802 may be defined or formed from uncoated sections of common conductive sheet 810. In other examples, robust, compatible metallic tabs may be subsequently welded to conductive tabs 802, if required for a given application.

Figure 8B:
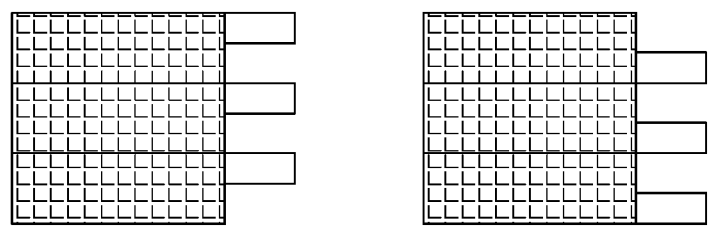
Figure 8B:
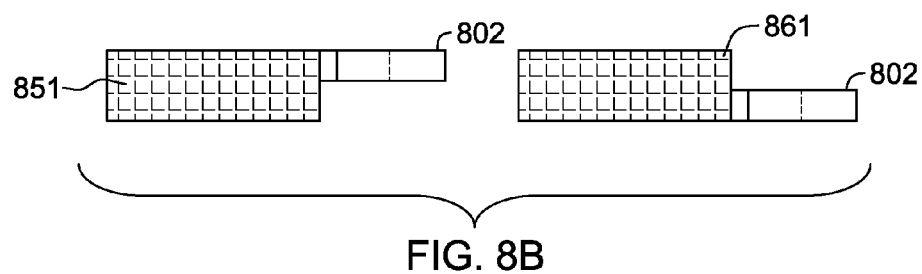
Figure 8C:
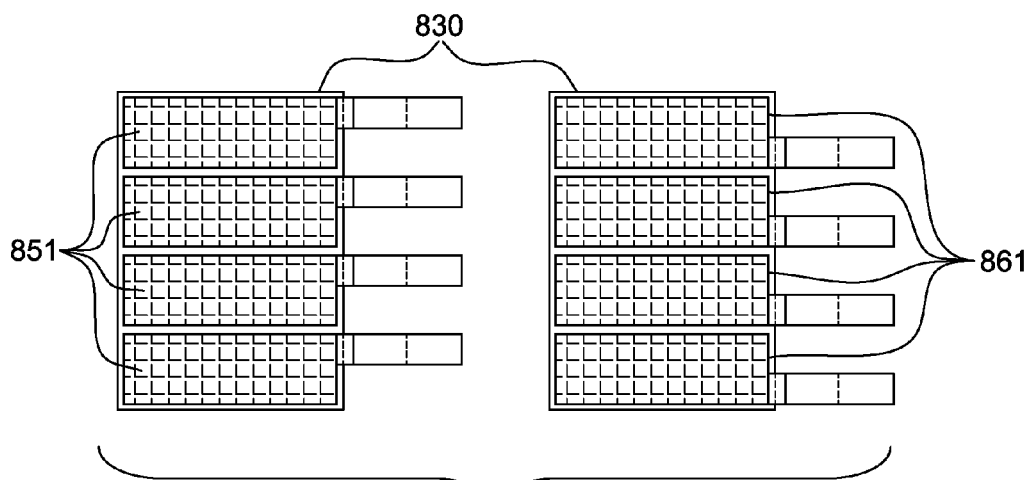

As shown in FIG. 8B, the common conductive sheet with the multiple electrodes may be cut into discrete structures 851, 861. Structures 851 may have conductive tabs 802 extending from a corner, such as the right top corner, and structures 861 may have conductive tabs 802 extending from a different corner, such as the bottom right corner. Continuing with FIG. 8C, several structures 851 may be placed over one permeable separator sheet 830, and several structures 861 may be placed over another permeable separator sheet 830. Permeable separator sheet 830 may then act as a carrier film for the structures for use with a belt laminator. For example, the structures may be wound onto a core along with permeable separator sheet 830, or the structures may be stacked in a magazine for subsequent feeding into the belt laminator.

Figure 8D:
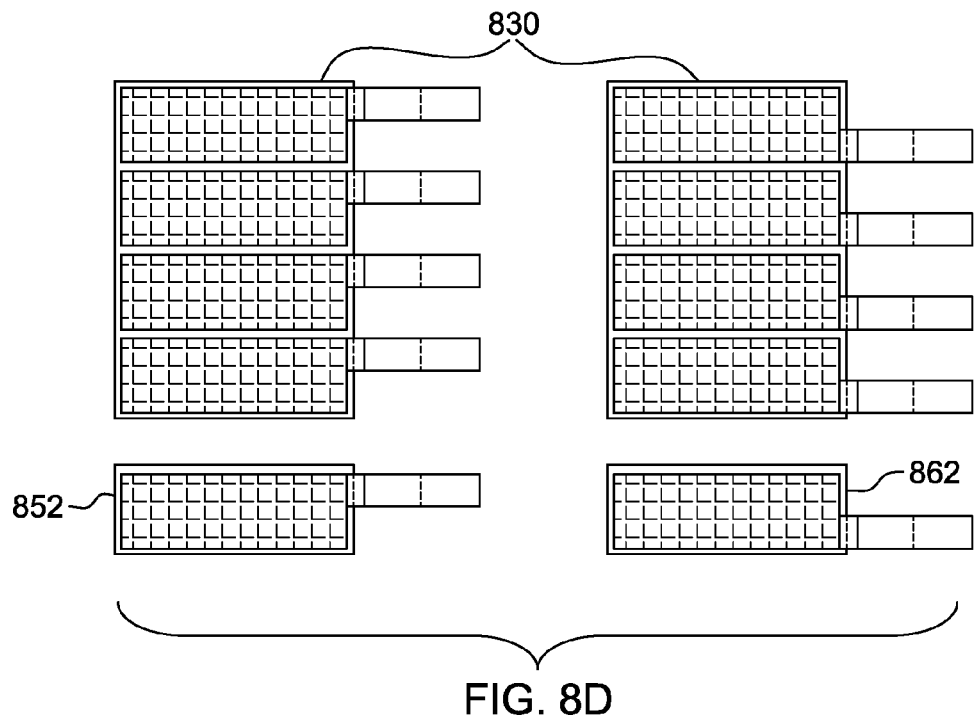

As illustrated in FIG. 8D, after bonding the structures to permeable separator sheets 830, permeable separator sheets 830 may be cut to create structures 852, 862. Structures 852, 862 each include an electrode, a conductive sheet portion, and a permeable separator sheet.

Figure 8E:
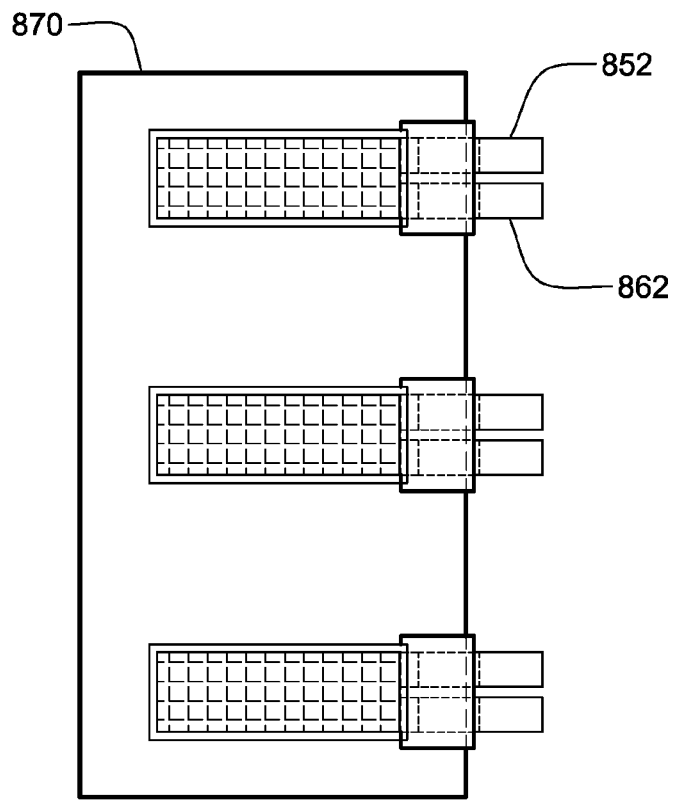
Figure 8F:
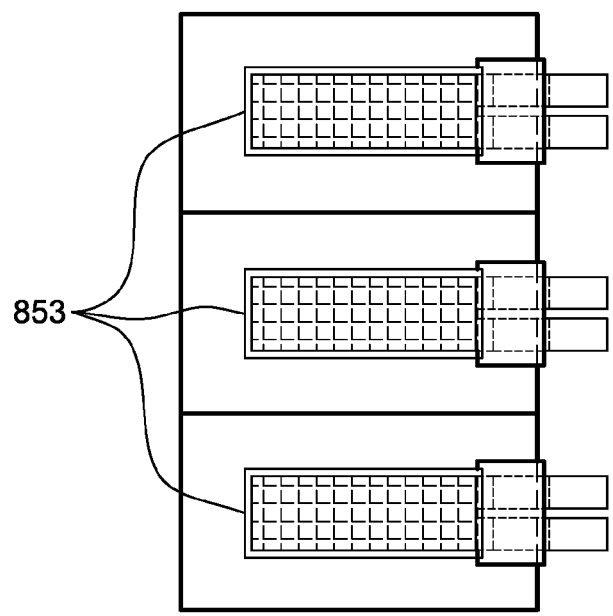

Next, as illustrated in FIG. 8E, structure 852 and structure 862 may be stacked and separated by a sealant layer 870, which may be a dielectric material. The sealant layer can be oriented to be in contact with both the conductive sheet portions of structure 852 and structure 862, and serves to electrically isolate the two structures. The stacked structures may then be cut and separated, as illustrated in FIG. 8F, to form structures 853.

Figure 8G:
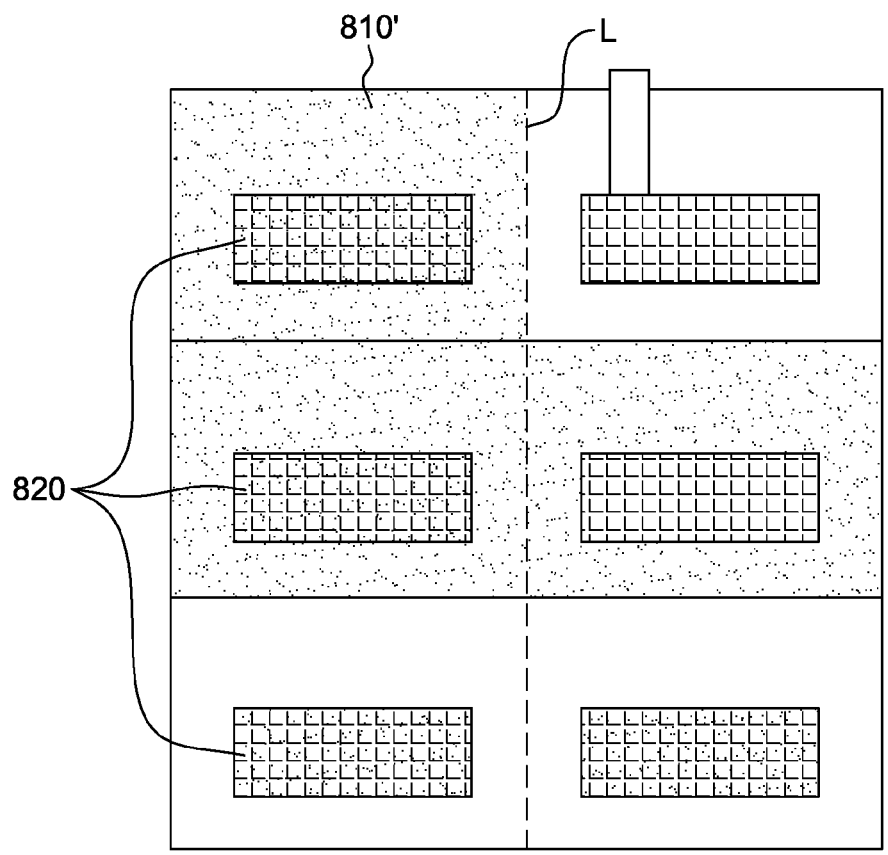

FIG. 8G illustrates another common conductive sheet 810' having multiple conductive sheet portions. The multiple conductive sheet portions include electrodes 820. Multiple first conductive sheet portions are separated from multiple second conductive sheet portions by a common line of symmetry L.

Figure 8H:
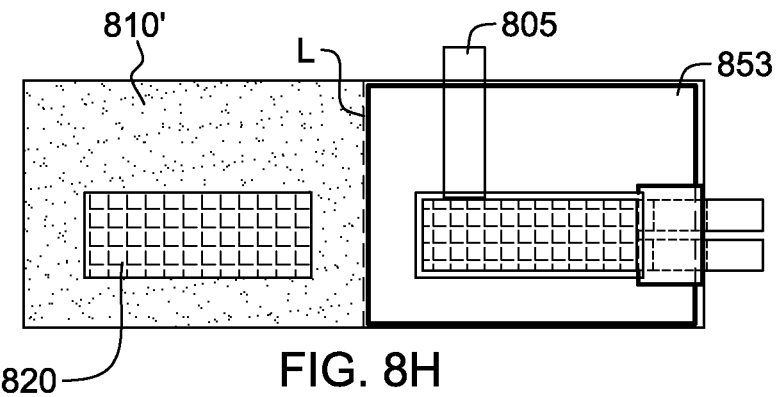

FIG. 8H illustrates a structure 853 being stacked over an electrode 820 of common conductive sheet 810'. As illustrated, the electrodes of structure 853 have been aligned with electrode 820 of common conductive sheet 810'. A port insert 805 may be provided with structure 853 to facilitate the introduction of an electrolyte into an electrolyte receiving chamber of one of the cells being fabricated.

Figure 8I:
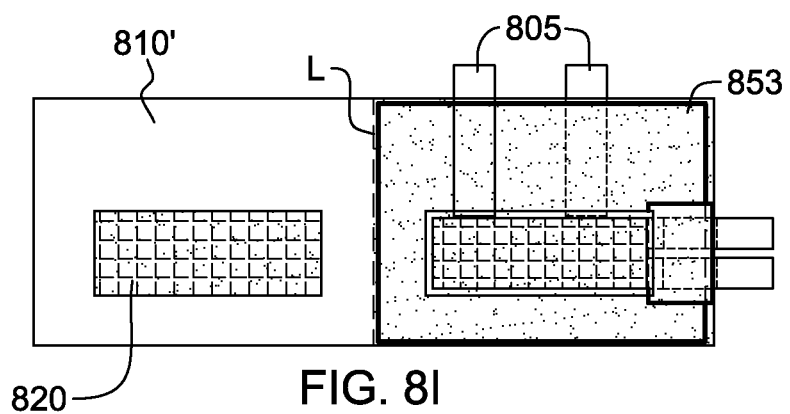

FIG. 8I illustrates a second port insert 805 provided with structure 853 to also facilitate introduction of the electrolyte into another electrolyte receiving chamber of another of the cells being fabricated.

Figure 8J:
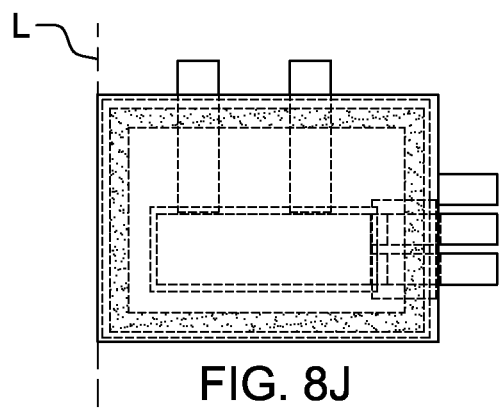

FIG. 8J illustrates folding common conductive sheet 810' to form an inverted bipolar energy storage structure. As may be understood, because common conductive sheet 810' has been folded around structure 853 (see FIG. 8H), contact to any either side of the resultant energy storage structure will provide a voltage equal to the voltage of one of the cells. Contact to conductive tabs 802 may be used to deliver ground and the combined series voltage of the two cells of the inverted bipolar energy storage structure.

FIGS. 8A-8J illustrate one example of how multiple energy storage structures may be assembled. As explained above, an inverted bipolar build may have a common conductive surface on both outer surfaces. Conceptually, an inverted bipolar build may be turned inside-out to create another bipolar build. In such a case, the conductive surfaces may be separated by a dielectric sealant layer, or another non conductive layer, to prevent the energy storage device from shorting out. By providing multiple conductive contact tabs from within various layers of the energy storage device, different cells therein may be accessed, to provide multiple voltage and power functions to an attached electronic assembly, which is to be powered by the energy storage device.

Figure 9A:
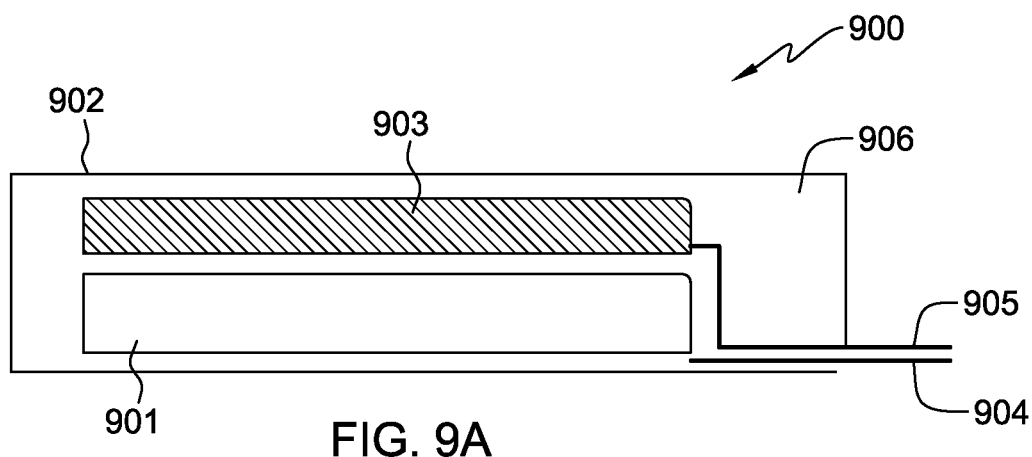
FIG. 9A depicts an embodiment of an energy storage structure including a battery and an ultra-capacitor structure, in accordance with one or more aspects of the present invention.

FIG. 9A depicts an embodiment of an energy storage structure 900 including a battery 901 and an ultra-capacitor structure 903, in accordance with one or more aspects of the present invention. In the illustrated embodiment, energy storage structure 900 includes an insulating pouch 902, or casing, surrounding both battery 901 and ultra-capacitor structure 903. In one example, battery 901 includes rolled up electrodes and separator materials, but is not encased in a separate casing. Instead, a battery electrolyte 906 may be disposed within casing 902. In such an example, ultra-capacitor structure 903 may be encased in its own hermetic sealing. As illustrated, battery 901 includes a first conductive tab 904, and ultra-capacitor structure 903 includes a second conductive tab 905, and the conductive tabs extend outward from insulating pouch 902.

Figure 9B:
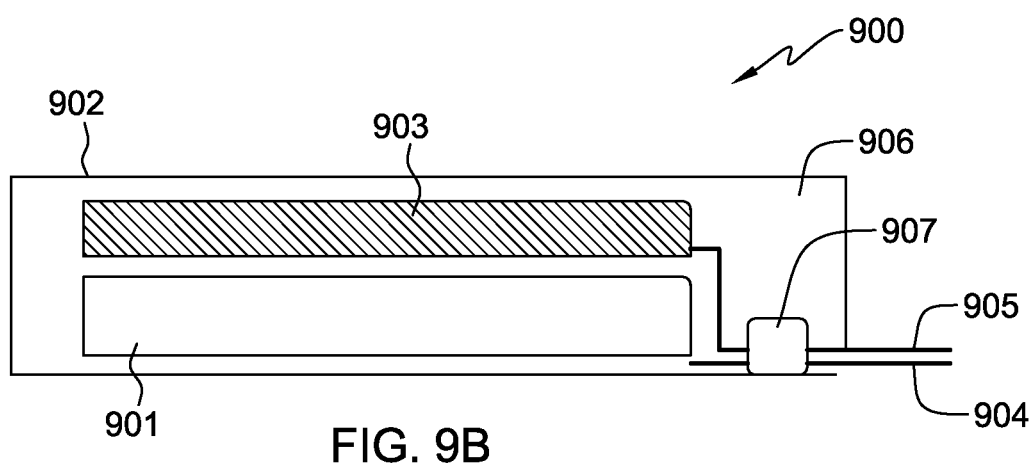
FIG. 9B depicts another embodiment of an energy storage structure including a battery and an ultra-capacitor structure, in accordance with one or more aspects of the present invention.

FIG. 9B illustrates another embodiment of an energy storage structure 900' including a battery 901 and an ultra-capacitor structure 903, in accordance with one or more aspects of the present invention. In the illustrated embodiment, energy storage structure 900' includes a circuit board 907 connecting battery 901 and ultra-capacitor 903 together with control circuitry, including circuitry for switching between parallel and series connections between sub-elements, or cells, of ultra-capacitor 903.

In one embodiment, the batter and ultra-capacitor share a common electrolyte. In another embodiment, the battery has its own insulated pouch material, maintaining isolation of electrolytic material between the battery and the ultra-capacitor. In another example, more than one battery and more than one ultra-capacitor may be provided within the insulating pouch, allowing for multiple voltage and power levels to be provided by the energy storage structure. Within the insulating pouch, electrical series, parallel, or other connections may be made as needed to facilitate voltage and power requirements. For example, the batteries and super-capacitors may be arranged such that one or more elements may be charged while others are discharged. The control circuitry could facilitate such operation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method comprising:
    fabricating a pouchless supercapacitor structure, the fabricating comprising:
        providing a first conductive sheet portion and a second conductive sheet portion separated by a permeable separator sheet, the first conductive sheet portion and the second conductive sheet portion each defining, at least in part, a respective outer wall of the supercapacitor structure;
        providing a first electrode at a first surface region of the first conductive sheet portion, the first electrode facing a first surface of the permeable separator sheet and providing a second electrode at a second surface region of the second conductive sheet portion, the second electrode facing a second surface of the permeable separator sheet, the first surface and the second surface of the permeable separator sheet being opposite surfaces thereof;
        providing at least one border between the first conductive sheet portion and the second conductive sheet portion, the at least one border encircling and forming a bordering frame around at least one of the first electrode or the second electrode, wherein the bordering frame facilitates forming an electrolyte receiving chamber extending through the permeable separator sheet, the electrolyte receiving chamber being defined, at least in part, by the first conductive sheet portion, the second conductive sheet portion and the at least one border; and
        providing an electrolyte within the electrolyte receiving chamber, including in contact with the first electrode and the second electrode, wherein the electrolyte is capable of passing through the permeable separator sheet, and wherein the electrolyte is provided through a port insert through a border of the at least one border of the pouchless supercapacitor structure.

2. The method of claim 1, wherein the first conductive sheet portion and the second conductive sheet portion are current collectors of the supercapacitor structure, and providing the first electrode and the second electrode comprises coating the first surface region of the first conductive sheet portion and the second surface region at the second conductive sheet portion with a common electrode material to form the first electrode and the second electrode.

3. The method of claim 1, wherein the bordering frame provides a fluid-tight seal around the electrolyte receiving chamber and comprises a chemically resistant material, the chemically resistant material inhibiting leakage from the electrolyte receiving chamber.

4. The method of claim 1, wherein providing the at least one border comprises using a flowable material in forming the at least one border.

5. The method of claim 1, wherein the at least one border comprises a pressure sensitive adhesive.

6. The method of claim 1, further comprising providing at least one conductive tab electrically connected to and extending outward from at least one of the first conductive sheet portion or the second conductive sheet portion.

7. The method of claim 1, wherein the bordering frame comprises an electrical insulator, the electrical insulator facilitating electrically isolating the first conductive sheet portion from the second conductive sheet portion.

8. The method of claim 1, wherein providing the at least one border further comprises heating the at least one bonding border to bond the first conductive sheet portion, the second conductive sheet portion, and the permeable separator sheet together.

9. The method of claim 1, wherein providing the at least one border further comprises applying pressure to the at least one border to bond the first conductive sheet portion, the second conductive sheet portion, and the permeable separator sheet together.

10. The method of claim 1, further comprising:
providing a multi-cell supercapacitor structure, wherein outer surfaces of the multi-cell supercapacitor structure are defined by at least one conductive sheet defining current collectors of different cells of the multi-cell supercapacitor structure, wherein cells of the multi-cell supercapacitor structure each include a respective permeable separator sheet within an electrolyte receiving chamber, and the cells being ionically isolated from each other.

11. The method of claim 10, wherein the providing comprises folding the at least one conductive sheet to define the one or more outer surfaces of the multi-cell supercapacitor structure.

12. The method of claim 10, wherein the fabricating comprises fabricating the multi-cell supercapacitor structure as a flexible energy storage structure, the flexible energy storage structure being capable of being bent at any angle.

13. The method of claim 10, further comprising providing at least one conductive tab electrically connected to and extending outward from the at least one conductive sheet.

14. A structure comprising:
a pouchless supercapacitor structure, the supercapacitor structure comprising:
a first conductive sheet portion and a second conductive sheet portion separated by a permeable separator sheet, the first conductive sheet portion and the second conductive sheet portion each defining, at least in part, a respective outer wall of the supercapacitor structure;
providing a first electrode at a first surface region of the first conductive sheet portion, the first electrode facing a first surface of the permeable separator sheet and providing a second electrode at a second surface region of the second conductive sheet portion, the second electrode facing a second surface of the permeable separator sheet, the first surface and the second surface of the permeable separator sheet being opposite surfaces thereof;
providing at least one border between the first conductive sheet portion and the second conductive sheet portion, the at least one border encircling and forming a bordering frame around at least one of the first electrode or the second electrode, wherein the bordering frame facilitates defining an electrolyte receiving chamber extending through the permeable separator sheet, the electrolyte receiving chamber being defined, at least in part, by the first conductive sheet portion, the second conductive sheet portion and the at least one border; and
an electrolyte within the electrolyte receiving chamber, including in contact with the first electrode and the second electrode, wherein the electrolyte is capable of passing through the permeable separator sheet, and wherein the electrolyte is provided through a port insert through a border of the at least one boarder of the pouchless supercapacitor structure.

15. The structure of claim 14, further comprising:
multiple supercapacitor structures, the multiple supercapacitor structures comprising multiple first conductive sheet portions of a common conductive sheet separated from multiple second conductive sheet portions of the common conductive sheet by a common line of symmetry, wherein the common conductive sheet is folded along the common line of symmetry to substantially align the multiple first conductive sheet portions and the multiple second conductive sheet portions substantially with the permeable separator sheet therebetween.

16. The structure of claim 14, further comprising at least one conductive tab electrically connected to and extending outward from at least one of the first conductive sheet portion or the second conductive sheet portion.

17. The structure of claim 14, wherein providing the first electrode and the second electrode comprises coating, at least in part, the first surface region of the conductive sheet portion and the second surface region of the second conductive sheet portion with a common electrode material to form the first electrode and the second electrode.

18. The structure of claim 14, further comprising:
a battery structure, the battery structure comprising a set of first conductive tabs;
wherein the supercapacitor structure comprises a set of second conductive tabs; and
an insulating pouch, the insulating pouch surrounding the battery structure and the supercapacitor, wherein the set of first conductive tabs and the set of second conductive tabs are electrically connected.

19. The method of claim 1, wherein the at least one border is disposed, at least in part, between the permeable separator sheet and at least one of the first conductive sheet portion or the second conductive sheet portion.

20. The method of claim 19, wherein the at least one border traps and seals the permeable separator sheet at the edge thereof to, in part, form the electrolyte receiving chamber.

21. The structure of claim 14, wherein the at least one border is disposed, at least in part, between the permeable separator sheet and at least one of the first conductive sheet portion or the second conductive sheet portion.

22. The structure of claim 21, wherein the at least one border traps and seals the permeable separator sheet at the edge thereof to, in part, form the electrolyte receiving chamber.

* * * * *